United States Patent Office 3,518,060
Patented June 30, 1970

3,518,060
APPARATUS FOR CONVERTING UO₃ TO UF₄
Maurice Delange, Cherbourg, Henri Huet, St. Vrain, and Paul Vertes, Antony, France, assignors to Commissariat a l'Energie Atomique, Paris, France, an organization of France
Original application Mar. 29, 1965, Ser. No. 443,451, now Patent No. 3,403,986, dated Oct. 1, 1968. Divided and this application Oct. 25, 1966, Ser. No. 589,338
Claims priority, application France, Apr. 20, 1960, 824,748
Int. Cl. C10b
U.S. Cl. 23—262          2 Claims

ABSTRACT OF THE DISCLOSURE

A first reactor for converting $UO_3$, by counter-current reaction with a reducing gas, to $UO_2$, is mounted above a second reactor for converting the $UO_2$, by counter-current reaction with HF gas, to $UF_4$. The bottom of the first reactor is connected to the top of the second reactor by cooled passage means which provide the only outlet for the gases issuing from the second reactor. Means responsive to the temperature of the $UO_2$ in the passage means are used in order to control means which in turn control the flow rate of the HF gas into the second reactor, to ensure elimination of the HF gas from the gaseous stream entering the first reactor.

---

The present application is a division of our application Ser. No. 443,451, now Pat. No. 3,403,986, filed by us on Mar. 29, 1965, for "Method and Apparatus for the Obtainment of Uranium Fluoride," which was itself a continuation-in-part of our copending U.S. patent application Ser. No. 102,740, filed by us on Apr. 13, 1961, for "Method and Apparatus for the Obtainment of Uranium Fluoride," now abandoned.

The invention relates to apparatus for the manufacture of uranium fluoride by means of a stream of hydrofluoric acid gas flowing in countercurrent fashion through a mass of granular uranium oxide $UO_2$ travelling under the effect of gravity through a vertical hydrofluorination reactor to the bottom of which the stream of hydrofluoric acid is fed.

According to the present invention, said uranium oxide $UO_2$ is obtained by reduction of a mass of granular uranium oxide $UO_3$ travelling under the effect of gravity through a second vertical reactor located above the first one and the bottom of which communicates permanently with the top of the fluorination reactor, and said two vertical reactors are connected together, without any outflow of gas therefrom, the top of the hydrofluorination reactor unit forming a cooling zone adapted to ensure absorption of unreacted hydrofluoric acid gas by the granular mass travelling from the reduction reactor to the hydrofluorination reactor unit.

Thus, whereas the temperature in the main zone of the hydrofluorination reactor unit may be as high as 500–600° C., this temperature is reduced to 200–300° C. in the top cooling zone opening into the reduction reactor bottom.

In these conditions, the only gaseous product flowing out from said cooling zone at the top thereof is water vapor which passes into the reduction reactor where it contributes in lowering the temperature at the bottom thereof.

According to another feature of the invention we provide means responsive to the temperature of the granular material flowing down through the cooling upper zone of the hydrofluorination reactor for controlling one of the factors determining the hydrofluorination reaction and in particular the flow rate of hydrofluoric acid fed to said hydrofluorination reactor.

Preferred embodiments of the present invention will be hereinafter described with reference to the appended drawings, given merely by way of example, and in which.

Figure 1:
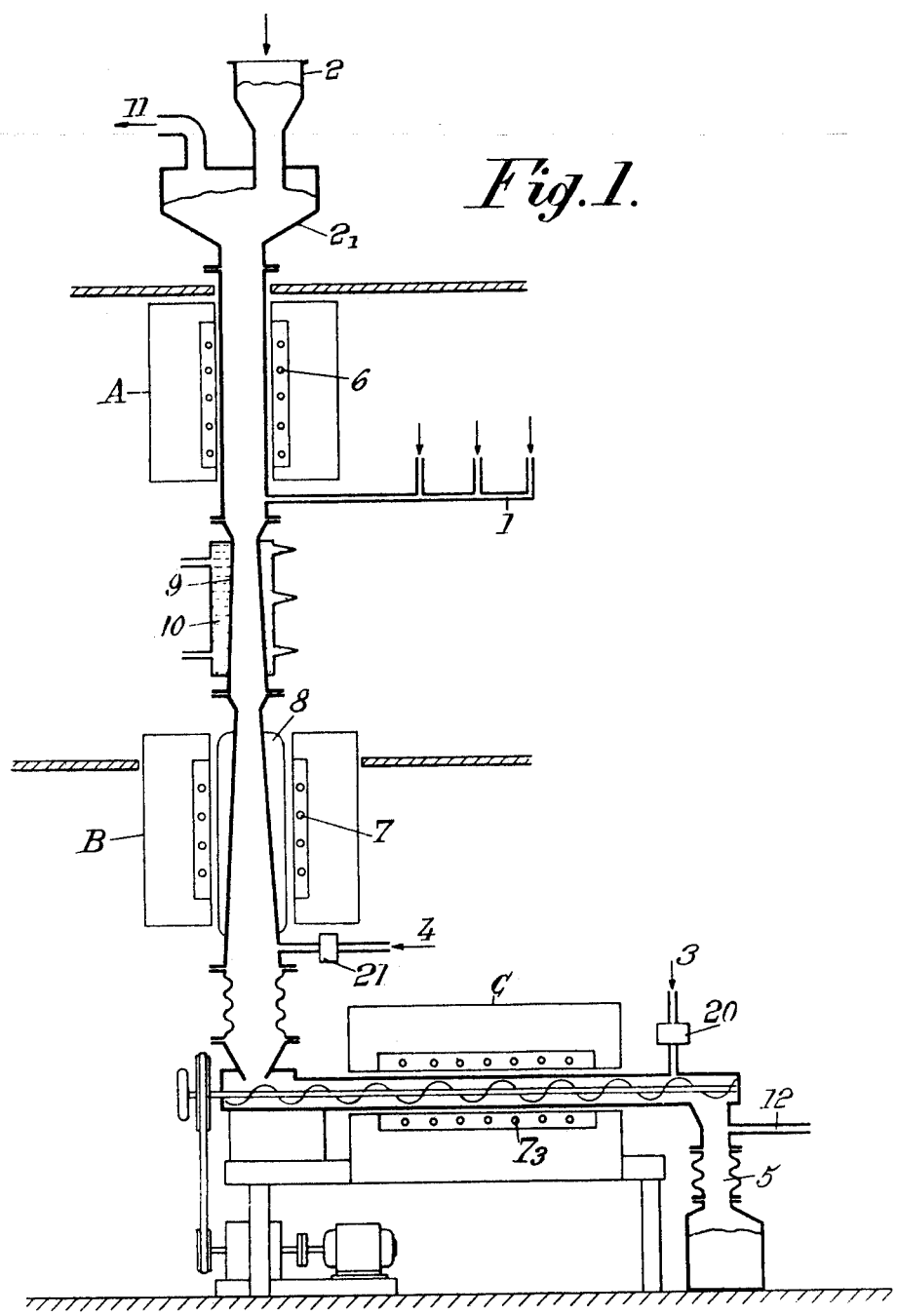
FIG. 1 is a diagrammatic vertical sectional view of a plant for the obtainment of uranium fluoride according to the present invention.

A plant according to the present invention, as illustrated by FIG. 1, comprises:

(a) On the one hand, at the top, a reduction reactor A receiving at 2, through a hopper 2₁, uranium oxide $UO_3$ so as to transform it, under the action of a reducing gas (hydrogen and/or ammonia, for instance) arriving at 1 and flowing out at 11, into uranium oxide $UO_2$, an electric heating being provided at 6 to ensure for instance a reduction temperature of the order of 600° C.–700° C., and (b) On the other hand, under reactor A the hydrofluorination means comprising essentially a vertical reactor B and a horizontal reactor C in series therewith, these reactors being heated at 7 and 7₃, respectively. The horizontal reactor C is a furnace provided with an endless screw for conveying $UF_4$ toward a receiver 5. Hydrofluoric acid is fed both at 3 to the bottom of reactor C and at 4 to the bottom of reactor B, for instance at the rate of ⅔ of the total feed at 3 and ⅓ thereof at 4. Valves, such as 20 and 21 are provided to adjust the amount of HF gas fed to the circuit.

The top of vertical reactor B carries an extension 9 of conical shape tapering toward the top, in combination with cooling means 10 for absorbing, according to the present invention, the residual hydrofluoric acid gas so that only the stoichiometric proportion thereof is used.

A device 8, comprising for instance cooling blades, may be provided on said reactor B to ensure a first cooling in the main portion of the reactor.

The operation takes place as follows:

Uranium oxide in the form of grains, delivered from the bottom of reducing reactor A, reacts, in the hydrofluorination means according to the balanced reaction:

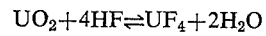

$$UO_2 + 4HF \rightleftharpoons UF_4 + 2H_2O$$

The state of equilibrium depends essentially upon the temperature. From the curve of the concentration of HF in the gaseous phase plotted as a function of the temperature, it is seen that this concentration, which reaches 27.4% at 550° C., drops to only 1.4% at 200° C.

But the speeds of treatment also depend upon the temperature, so that it is practically impossible to work at 200° C., the speed of reaction being too low at this temperature.

It is therefore necessary, in order to ensure the best possible utilization of HF in conditions close to the stoichiometric conditions, to provide a compromise between the speed of reaction and the temperature, that is to say:

To provide in the most active portion of the treatment apparatus, in particular in the extraction reactor C and in the vertical reactor B proper, high temperatures of the orde of 500–600° C.

But to provide between the top of reactor B and the bottom of reduction reactor A, in the extension 9 above reactor B, cooling means 10 such that the temperature drops to a relatively low value of the order for instance of 200° C., from the top end of reactor B, to the bottom end of reactor A.

Figure 2:
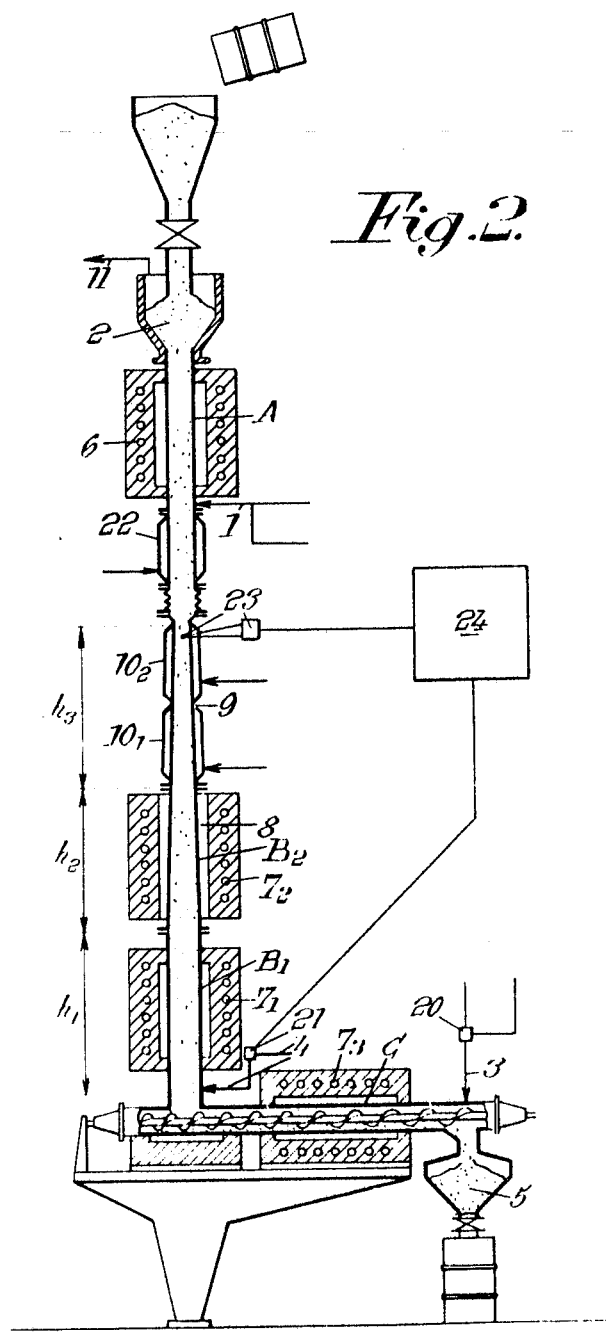
FIG. 2 is a similar view of another embodiment of such a plant.

Preferably, as illustrated by FIG. 2, said cooling means consists of several elements corresponding to different temperature ranges, the times for which the solid matters remain in said ranges being chosen in accordance with the speeds of treatment at the temperatures that are considered.

For instance we provide, as shown by FIG. 2, above vertical reactor $B_1$, provided with its heating coil $7_1$:

First a zone $B_2$ about which, initially, heating means $7_2$ may be provided, said means being subsequently removed or moved away in such manner that said zone $B_2$, which may be provided with cooling blades, can have a cooling action, reducing the temperature to values of the order of 400–450° C.

Then a zone 9 where the temperature decreases from 400° C. down to 200° C., and even 150° C., under the effect of several cooling devices, such as $10_1$ and $10_2$ disposed at different levels. For instance the first cooling device $10_1$ is fed with steam at 6 kgs./cm.$^2$, whereas the second one, $10_2$, is fed with steam at 2 kgs./cm.$^2$.

Figure 3:
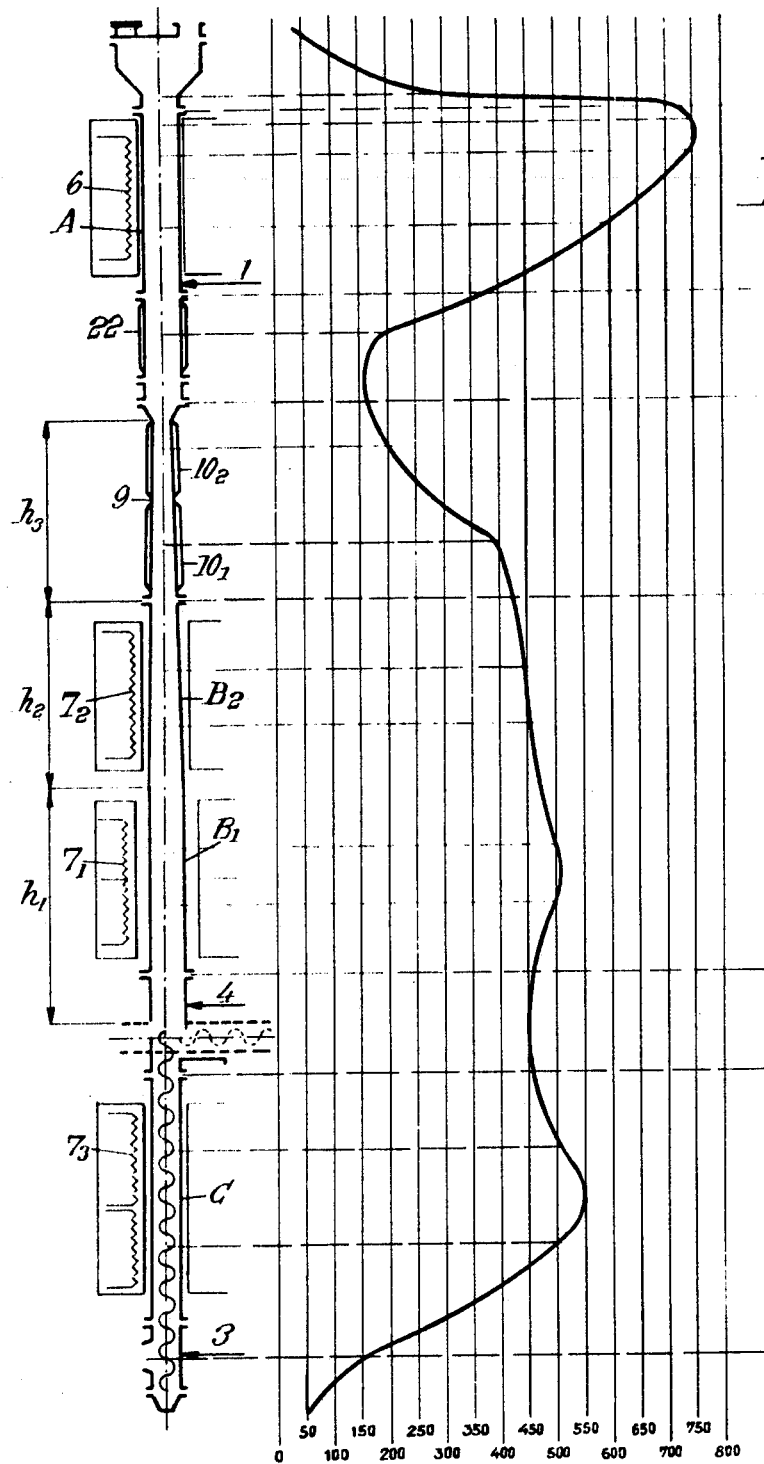
FIG. 3 is a diagram showing the evolution of the temperature from one end of the plant to the other end.

FIG. 3 shows the temperature diagram in the system of FIG. 2. This system is supposed to be provided for a production of about 50 kgs. of $UF_4$ per hour. The cross sections, in square decimeters, are of the order of 2.4 for extraction reactor C (with a rate of filling of ⅔) and vary in reactor elements $B_1$, $B_2$ and 9, from 4.9 at the bottom of $B_1$ to about 1.8 or 2 at the upper end of 9.

The time for which the matters remain in portion $B_1$ is about 2.40 hours. It drops to 2 hours in portion $B_2$ and then to values ranging from 0.70 hour to 1 hour in portion 9. In particular the time for which the matters remain at temperature $t_1$, reached opposite $10_1$ is about 0.40 hour, and is 0.30 hour at the lowest temperature $t_2$ reached opposite $10_2$.

The dimensions which, account being taken of the conical shape of the elements, would correspond to these times of treatment, are as follows: The respective heights of portions $h_1$, $h_2$ and $h_3$ are of the same order of magnitude, that is to say 1.70 m., 1.40 m. and 1.40 m., respectively. The length of the extraction reactor C is a little greater.

In this way, it is possible to use practically the whole of the hydrofluoric acid fed to the system, so that the gaseous stream issuing from the fluorination unit and passed to the reduction reactor A contains only water vapor and, of course, the reducing gas, such as hydrogen and/or ammonia, introduced at 1

The presence of this water vapor contributes in cooling down the granular material issuing from the reduction reactor A. A supplementary cooling, for instance by means of a water jacket, may be provided at 22.

Thus we dispense with means, located between the reduction reactor, and the hydrofluorination unit, for recovering an excess of hydrofluoric acid gas, as this was the case in prior systems. Furthermore the gaseous stream issuing from the hydrofluorination unit consists of water vapor used for useful purposes.

It may however happen that the temperature at the top of portion 9 and the total flow rate of HF fed to the system do not quite correspond to each other, in particular due to variations in the nature and the grain sizes of the uranium oxide.

Therefore, we advantageously provide, according to another feature of our invention, means responsive to the temperature of the solid material entering the hydrofluorination unit for acting upon the parameters of the reactions taking place in the system in particular:

either upon the flow rate of hydrofluoric acid gas fed at 4, at the bottom of the vertical hydrofluorination reactor, or, upon the rate of circulation of the solid material and in particular upon the speed of revolution of the extractor screw of horizontal reactor C.

If we act upon the flow rate of hydrofluoric acid gas entering at 4, that is to say upon ⅓ of the total flow rate (whereas the remainder, fed at 3, is fixed) we provide for this purpose a pyrometer 23 disposed to measure the temperature in the mass of uranium oxide entering the portion 9 of the hydrofluorination system and the electric voltage thus obtained is made to act upon a control apparatus 24 (FIG. 2) capable of controlling in a suitable manner the valve 21 which controls the HF inflow through 4 in such manner that:

any rise of this temperature above a predetermined limit produces a reduction of the HF flow rate at 4, and a reduction of this temperature below this limit produces an increase of the HF flow rate at 4.

Figure 4:
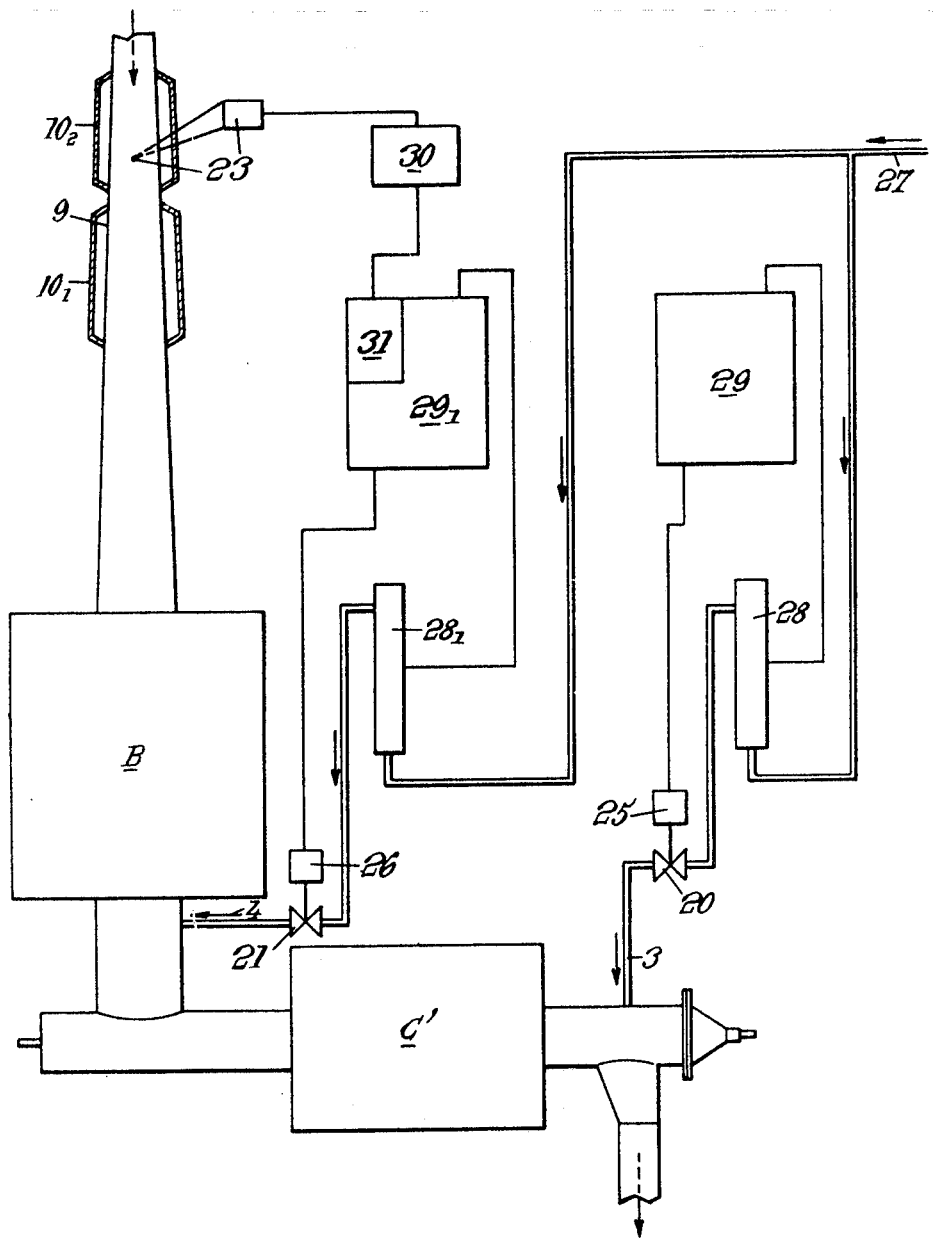
FIG. 4 illustrates separately on an enlarged scale, some features of the invention.

This control is preferably effected in an automatic fashion through apparatus such as illustrated by FIG. 4.

In this embodiment of our invention, valves 20 and 21 are of the type pneumatically operated by means of diaphragms 25 and 26, respectively.

Valve 20 is to be adjusted for a predetermined and constant value of the flow rate therethrough (as a rule ⅔ of the total flow rate). It is connected to feed conduit 27 through a flowmeter 25 of a known type transmitting pulses to an electric receiver 29.

This receiver is of the indicating and recording type. It records the pulses from flowmeter 25, that is to say the values of the flow rate, upon a circular diagram, for instance within a range from 700 to 7,000 liters per hour and it transmits a corresponding pneumatic signal to the control diaphragm 25. Therefore it acts as a mere regulating device so as finally to adjust valve 25 to a position, corresponding to a predetermined value of the flow rate, that is to say to a predetermined position of an index with respect to said diagram.

Valve 21 is adjusted in an analogous manner, through means shown at $28_1$, $29_1$ but, in addition, receiver $29_1$ is placed under the control of means responsive to variations of the temperature value given by pyrometer 23.

Said means comprise, on the one hand, a converter device 30 capable of transforming the electric signals supplied by pyrometer 23 into proportional pneumatic signals and on the other hand, operative by said pneumatic signals, an auxiliary receiver 31 incorporated in receiver $29_1$ for displacing the adjustment indicating index thereof, and therefore the HF flow rate determined by valve 21, in response to variations of the temperature measured by pyrometer 23.

In a general manner, while we have in the above description disclosed what we deem to be practical and efficient embodiments of the present invention, it should be well understand that we do not wish to be limited thereto as there might be changes made in the arrangement, disposition and form of the parts without departing from the principle of the present invention as comprehended within the scope of the appended claims.

What we claim is:

1. An apparatus for the treatment of uranium oxide which comprises a first vertical reactor, means for continuously feeding a granular mass of uranium oxide $UO_3$ at the top of said reactor and a stream of reducing gas at the bottom of said reactor so that said granular mass and said gas stream travel is countercurrent fashion through said first reactor and a granular mass of uranium oxide $UO_2$ is obtained at the bottom of said reactor, a second reactor, means for continuously feeding a stream of hydrofluoric acid gas HF at the bottom of said second reactor whereby said granular mass of uranium oxide $UO_2$ and said HF stream travel in countercurrent fashion through said second reactor, passage means between the bottom end of said first reactor and the top end of said second reactor, said passage means and said first reactor forming the only outflow for the gases issuing from said second reactor, means for cooling said passage means, whereby the uranium oxide $UO_2$ travelling through said passage means toward said second reactor absorbs the residual hydrofluoric acid gas from said second reactor, temperature responsive means to measure the temperature of the uranium oxide travelling through said passage means, and control means, controlled by said temperature responsive means, for controlling directly the flow rate of one of the two reactants into said second reactor, said control means thus controlling indirectly the rate of the reaction between the hydrofluoric acid gas HF and the uranium oxide $UO_2$ to ensure elimination of hydrofluoric acid gas from the gaseous stream entering said first reactor.

2. An apparatus for the treatment of uranium oxide which comprises a first vertical reactor, means for continuously feeding a granular mass of uranium oxide $UO_3$ at the top of said reactor and a stream of reducing gas at the bottom of said reactor so that said granular mass and said gas stream travel in countercurrent fashion through said first reactor and a granular mass of uranium oxide $UO_2$ is obtained at the bottom of said reactor, a second reactor, means for continuously feeding a stream of hydrofluoric acid gas HF into the bottom of said second reactor whereby said granular mass of uranium oxide $UO_2$ and said HF stream travel in countercurrent fashion through said second reactor, passage means between the bottom end of said first reactor and the top end of said second reactor, said passage means and said first reactor forming the only outflow for the gases issuing from said second reactor, means for cooling said passage means, whereby the uranium oxide $UO_2$ travelling through said passage means toward said second reactor absorbs the residual hydrofluoric acid gas from said second reactor, temperature responsive means to measure the temperature of the uranium oxide travelling through said passage means, and control means, controlled by said temperature responsive means, for controlling the feed of hydrofluoric acid gas into the bottom of said second reactor to ensure elimination of hydrofluoric acid gas from the gaseous stream entering said first reactor.

References Cited
UNITED STATES PATENTS 2,548,876   4/1951   De Jahn _____ 266—32 XR
2,739,800   3/1956   Sisco _____ 263—19

JAMES H. TAYMAN, JR., Primary Examiner

U.S. Cl. X.R.

23—277; 176—87; 236—15; 263—19; 266—32